March 26, 1946.  J. N. WOLFRAM  2,397,180
VIBRATION DAMPENING FITTING
Filed Feb. 8, 1944  2 Sheets-Sheet 1
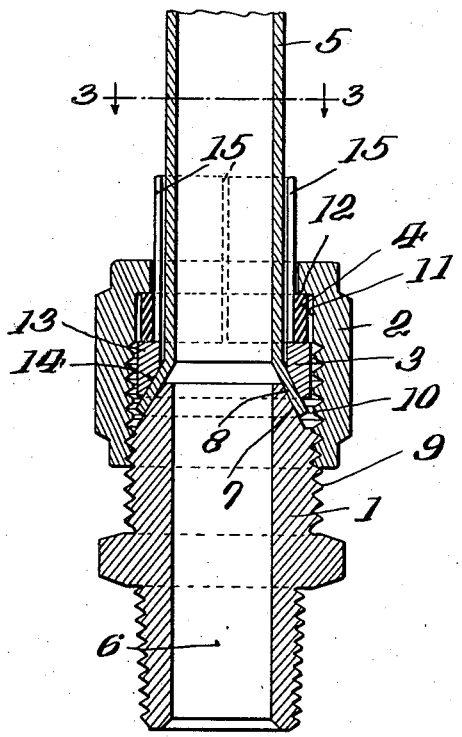
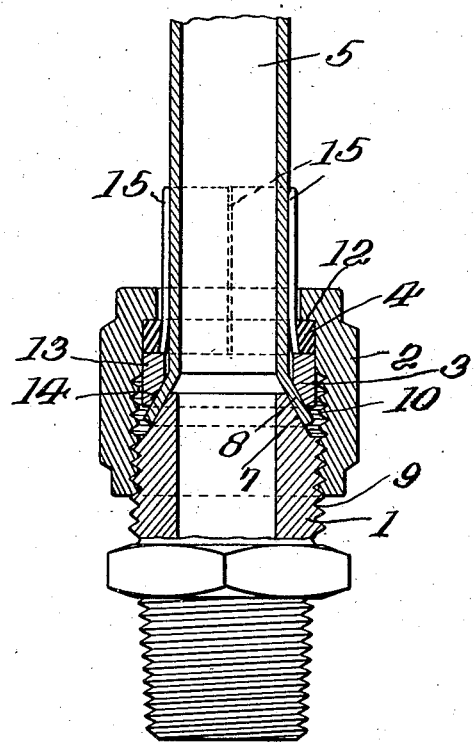
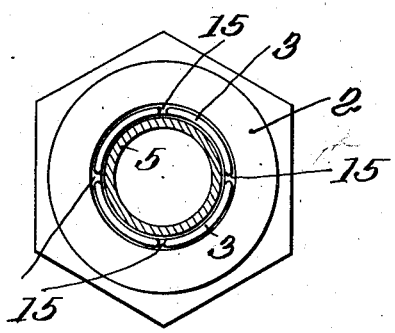
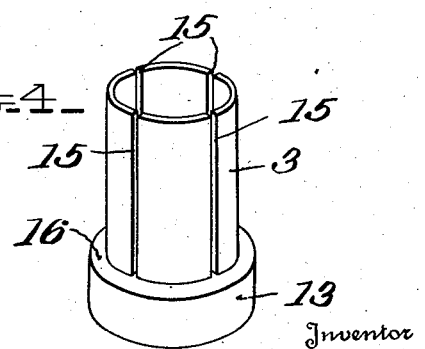
Inventor
John N. Wolfram
By Mason, Porter & Diller
Attorneys

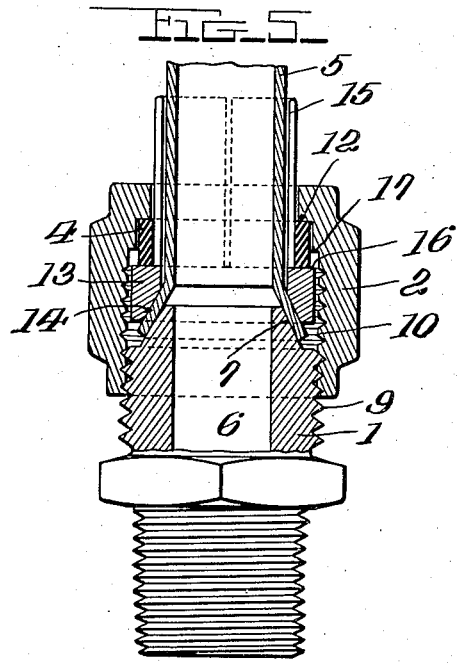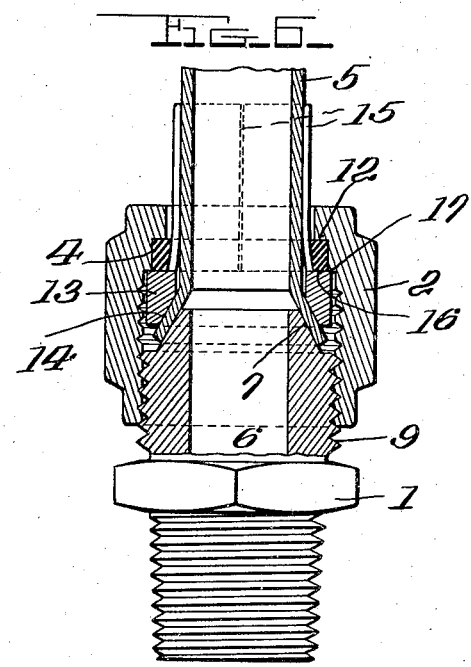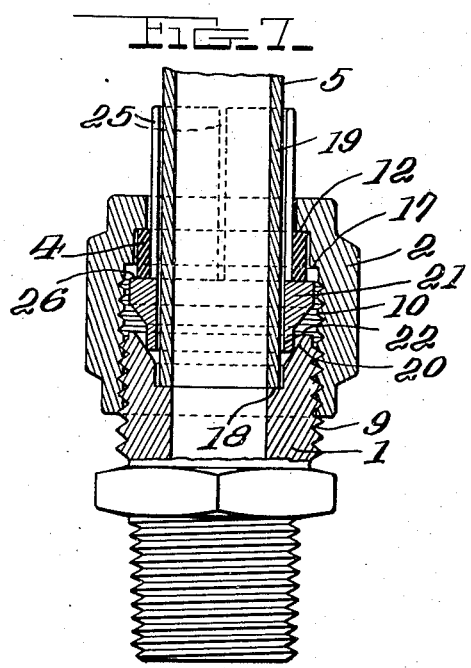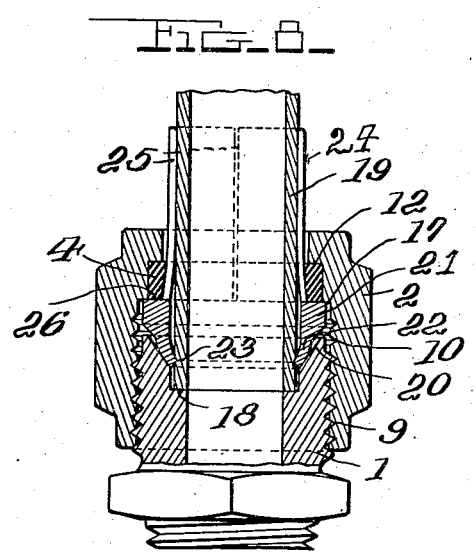

Patented Mar. 26, 1946

2,397,180

UNITED STATES PATENT OFFICE 2,397,180

VIBRATION DAMPENING FITTING

John N. Wolfram, Cleveland, Ohio, assignor to The Parker Appliance Company, Cleveland, Ohio, a corporation of Ohio Application February 8, 1944, Serial No. 521,556

5 Claims. (Cl. 285—86)

The invention relates to new and useful improvements in a coupling for tubes and more particularly to a coupling which is provided with means for gripping the tube and for dampening vibrations within the tube.

An object of the invention is to provide a coupling including a body member, a nut, a clamping sleeve and a deformable ring which is so constructed that the nut operating upon the deformable ring will cause the sleeve to grip the tube for securing the same to the coupling and will also cause the sleeve to engage the tube at points outside of the nut for dampening vibrations therein.

A further object of the invention is to provide a coupling of the above type wherein the sleeve is provided with a gripping head and with a portion extending outwardly from the nut which outwardly extending portion is provided with spaced longitudinal slits to facilitate the contracting of the sleeve into dampening relation with the tube.

A still further object of the invention is to provide a tube coupling of the above type wherein the nut and sleeve are so constructed that after the deformable member has been expanded into contact with the sleeve said nut positively engages the head of the sleeve for forcing it endwise into gripping relation with the tube.

These and other objects will in part be obvious and will in part be hereinafter more fully disclosed.

In the drawings,

Figure 1 is a longitudinal sectional view through a coupling with a tube placed therein and prior to the tightening of the parts for expanding the deformable member.

Figure 2 is a view similar to Figure 1, but showing the nut tightened onto the body member, the deformable ring compressed and expanded against the sleeve so as to cause the sleeve to contact with the tube and the head of the sleeve pressed against the flared end of the tube for clamping of the same against the seat on the body member.

Figure 3 is a section on the line 3—3 of Figure 1.

Figure 4 is a perspective view of the clamping sleeve.

Figure 5 is a view similar to Figure 1, but showing a slight modification of the nut whereby said nut will directly engage the head of the sleeve in the final closing of the coupling.

Figure 6 is a view similar to Figure 5, but showing the coupling in full closed position.

Figure 7 is a view similar to Figure 1, but showing a further modified form of the invention wherein the clamping sleeve digs into the tube and forces the tube endwise against a seat in the body member.

Figure 8 is a view similar to Figure 7, but showing the coupling in closed position.

The invention has to do with a coupling for tubes. The coupling as shown in Figures 1 to 3 inclusive includes a body member 1, a nut 2, a sleeve 3, and a deformable ring 4. The tube which is clamped against the body member is indicated at 5. Said body member is provided with means by which it may be firmly adapted to some part to which a tube is to be connected. There is a bore 6 through the body member and surrounding the bore is a seat 7 which is shown in Figures 1 and 2 as tapered. The tube 5 which is to be clamped by the coupling has the end thereof flared as indicated at 8 and the seat 7 is adapted to engage within the flared end of the tube. The body member is provided with a threaded portion 9. The nut 2 is provided with a threaded portion 10 which cooperates with the threaded portion 9 on the body member. The nut 2 is provided with a recess 11 and at the outer side of this recess said nut is formed with a shoulder 12.

The sleeve 3 is provided with a clamping head 13 which is solid and the inner face 14 of this clamping head is tapered to conform in general to the angle of the outer face of the flared end of the tube. This sleevehead when forced against the flared end of the tube by the nut will press the tube against the seat on the body member 1 and thus firmly grip and secure the tube to said body member. The sleeve is of sufficient length so that it projects outwardly from the solid head 13 to points well out beyond the nut. The sleeve is also provided with longitudinal slits 15 which extend from a point adjacent the solid head 13 to the outer end of the sleeve. As shown, there are four slits thus forming four sections of the sleeve which may more readily yield when a force is applied to the outer face of the sleeve in the region of the slitted portion. The sleevehead is also provided with a shoulder 16 which is opposed to the shoulder 12 on the nut. The deformable member lies in the recess 11 between these shoulders 12 and 16. This deformable member may be made of any suitable material which, when pressed upon, will be deformed but which is not compressible to any great extent. Rubber is preferably used. When the nut 2 is threaded onto the body member 1 after the parts have been assembled as shown in Figure 1, this deformable member will be pressed by the shoulder so as to be deformed and extended transversely. The recess is so dimensioned that the outward expansion of the ring 4 is limited and this will cause the inner portions of the ring to contact with the sleeve and press these yieldable sections of the sleeve inward into contact with the tube as shown in Figure 2. This contact of the yielding sections of the sleeve with the tube will dampen vibrations within the tube. When the nut is turned onto the body member the ring member 4 will be deformed transversely as stated, bringing the sleeve into firm contact with the tube and the said nut through the confined deformed ring 4 will force the head of the sleeve into firm gripping contact with the flared end of the tube and cause said tube end to be firmly clamped against the seat on the body member.

In Figures 5 and 6 of the drawings, the coupling in general is constructed the same as shown in Figures 1 to 2. The only distinction resides in an additional feature which has been applied to the nut, and therefore the numerals applied in detail to the coupling shown in Figures 1 and 2 have also been applied to the like features of construction in Figures 5 and 6. The additional feature noted is that the nut has two shoulders. It has a shoulder 12 which engages a deformable material and also a shoulder 17. When the nut is turned onto the body member in the construction shown in Figures 5 and 6, the deformable ring will be expanded transversely just as described in connection with Figures 1 and 2. The ring, however, is so dimensioned that when the sleeve has been contacted therewith and the yieldable outwardly extending members pressed against the tube for dampening the same, then the shoulder 17 will contact with the shoulder 16 for the final setting up of the coupling and the clamping of the flared end of the tube. In other words, when the coupling is closed there is a deforming of the ring for the clamping of the sleeve and there is a positive movement of the sleeve into clamping engagement with the flared end of the tube.

In Figures 7 and 8, which show a further modified form of construction, the body member 1 is provided with a seat 18. The tube 19 is not flared, but when clamped to the coupling the end of the tube engages this seat 18. The body member is also provided with a tapered surface 20 which performs a camming action on the sleeve in the clamping of the tube. The nut 2 is provided with a shoulder 12 and also with a shoulder 17 as described above. There are threaded connections between the nut and the body member.

The sleeve indicated at 21 is diffently constructed from the sleeve described in connection with the coupling shown in Figures 1 to 6. The sleeve has a gripping portion 22 which is dimensioned so that when forced into contact with the tapered surface 20 it will be contracted and caused to bite into the tube as indicated at 23 in Figure 8. This will force the tube endwise into tight engagement with the seat 18. It will also form a sealed connection between the tube and the sleeve. Inasmuch as this portion of the sleeve contacts with the camming surface which contracts it to accomplish the gripping of the tube, it will also make a tight sealing contact with the body member and this insures a very tight seal formed between the tube and the coupling parts. The sleeve is provided with a portion extending from the head outwardly beyond the nut as indicated at 24. The sleeve is also provided with longitudinal slots 25 similar to those described in connection with Figures 1 and 2.

The deformable ring 4 is in general of the same construction as described above. The sleeve has a shoulder 26 which is opposed to the shoulder 12 and the deformable member lies in the recess in the nut between these shoulders 12 and 26. This deformable member surrounds the sleeve and when the duct is closed, as shown in Figure 8, the deformable member will be compressed and expanded transversely until it contacts with the wall of the nut and is then pressed against the yielding projecting members of the sleeve for forcing them into gripping engagement with the tube for dampening the vibrations within the tube. After the deformable member has clamped the sleeve against the tube, then the shoulder 17 will contact with the shoulder 26 and will force the sleeve along the tapered surface 20 causing the end of the sleeve to be contracted and bite into the tube and force the tube positively against the seat on the body member.

It is obvious that many changes in the details of construction may be made without departing from the spirit of the invention as set forth in the appended claims.

I claim:

1. A coupling for tubes comprising a body member, a nut having threaded engagement with said body member, a sleeve disposed within said nut and projecting outwardly from said nut along the tube, and a deformable ring disposed within said nut and surrounding said sleeve, said sleeve having a gripping head provided with a shoulder against which said ring may be pressed and longitudinal slits extending from points adjacent said shoulder to the outer end of the sleeve, said nut having a shoulder opposed to the shoulder on said head and dimensioned so that the ring when pressed upon by said nut will be deformed and caused to press the sleeve members projecting from the nut into contact with the tube for dampening vibration therein and also caused to press against the shoulder on said head and move the same endwise into gripping contact with the tube.

2. A coupling for tubes comprising a body member, a nut having threaded engagement with said body member, a sleeve disposed within said nut and projecting outwardly from said nut along the tube, and a deformable ring disposed within said nut and surrounding said sleeve, said sleeve having a gripping head provided with a shoulder against which said ring may be pressed and longitudinal slits extending from points adjacent said shoulder to the outer end of the sleeve, said nut having a shoulder opposed to the shoulder on said head and dimensioned so that the ring when pressed upon by said nut will be deformed and caused to press the sleeve members projecting from the nut into contact with the tube for dampening vibration therein and also caused to move endwise into gripping contact with the tube, said nut having a second shoulder disposed relative to the first named shoulder thereon so that when said deformable member has been expanded into contact with the sleeve and the sleeve member forced into contact with the tube, said second shoulder will engage the shoulder on the sleevehead and positively force the sleevehead into gripping contact with the tube.

3. A coupling for tubes having the end thereof flared comprising a body member provided with a seat adapted to engage within the flared end of the tube, a nut having threaded engagement with said body member, a sleeve disposed within said nut and projecting outwardly from said nut along the tube, a deformable ring disposed within said nut and surrounding said sleeve, said sleeve having a solid head provided with a tapered inner face adapted to engage the flared end of the tube for clamping the same against the seat on the body member, and with a shoulder against which said ring may be pressed, said sleeve having longitudinal slits extending from points adjacent said head to the outer end of the sleeve and forming therebetween members adapted to engage the tube for dampening vibrations therein, said nut having a shoulder opposed to the shoulder on said head and dimensioned so that the ring when pressed upon by said nut will be deformed and caused to press the sleeve members projecting from the nut into contact with the tube and move the sleeve endwise for clamping the flared end of the tube against the seat on the body member.

4. A coupling for tubes having the end thereof flared comprising a body member provided with a seat adapted to engage within the flared end of the tube, a nut having threaded engagement with said body member, a sleeve disposed within said nut and projecting outwardly from said nut along the tube, a deformable ring disposed within said nut and surrounding said sleeve, said sleeve having a solid head provided with a tapered inner face adapted to engage the flared end of the tube for clamping the same against the seat on the body member, and with a shoulder against which said ring may be pressed, said sleeve having longitudinal slits extending from points adjacent said head to the outer end of the sleeve and forming therebetween members adapted to engage the tube for dampening vibrations therein, said nut having a shoulder opposed to the shoulder on said head and dimensioned so that the ring when pressed upon by said nut will be deformed and caused to press the sleeve members projecting from the nut into contact with the tube and move the sleeve endwise for clamping the flared end of the tube against the seat on the body member, said nut having a second shoulder disposed relative to the first named shoulder thereon so that when said deformable member has been expanded into contact with the sleeve and the sleeve member forced into contact with the tube said second shoulder will engage the shoulder on the sleevehead and positively force the sleevehead into gripping contact with the tube.

5. A coupling for tubes comprising a body member, a nut having threaded engagement with said body member, a sleeve disposed within said nut and projecting outwardly from said nut along the tube, a deformable ring disposed within the nut and surrounding said sleeve said body member having a seat for the end of the tube and a camming surface surrounding the tube and spaced therefrom, said sleeve having the inner end thereof dimensioned so that when forced into contact with the camming surface on the body member said inner end will be contracted and caused to bite into the tube and force the tube into firm sealing contact with the seat on the body member, said sleeve being provided with a shoulder against which the ring may be pressed and longitudinal slits extending from points adjacent said shoulder to the outer end of the sleeve, said nut having a shoulder opposed to the shoulder on the sleeve and dimensioned so that the ring when pressed upon by said nut will be deformed and caused to press the sleeve members projecting from the nut into contact with the tube for dampening vibrations therein, said nut having a second shoulder adapted to engage the shoulder on the sleeve after said ring has been deformed for positively forcing the sleeve against the camming surface for causing the inner end thereof to bite into and grip the tube.

JOHN N. WOLFRAM.